(12) United States Patent
Smith (10) Patent No.: US 9,571,434 B1
(45) Date of Patent: *Feb. 14, 2017

(54) SYSTEM AND METHOD FOR VISUAL DISPLAY OF E-MAIL FILTERS

(71) Applicant: Google Inc., Mountain View, CA (US)

(72) Inventor: Randall David Smith, Arlington, MA (US)

(73) Assignee: GOOGLE INC., Mountain View, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 13/972,780

(22) Filed: Aug. 21, 2013

Related U.S. Application Data (63) Continuation of application No. 13/227,371, filed on Sep. 7, 2011, now Pat. No. 8,543,655.

(51) Int. Cl.
  *H04L 12/58* (2006.01)
  *H04L 12/24* (2006.01)
  *G06F 3/0481* (2013.01)

(52) U.S. Cl.
  CPC .................................. *H04L 51/12* (2013.01)

(58) Field of Classification Search
  None
  See application file for complete search history.

(56) References Cited

U.S. PATENT DOCUMENTS

| | | | | |
|---|---|---|---|---|
| 4,663,704 A * | 5/1987 | Jones et al. | ...................... | 700/83 |
| 5,280,271 A * | 1/1994 | Berra | ............................ | 340/525 |
| 5,506,952 A * | 4/1996 | Choy | ........................ | G06F 8/34 |
| | | | | 715/763 |
| 6,009,475 A * | 12/1999 | Shrader | ......................... | 709/249 |
| 6,043,817 A | 3/2000 | Bolnick et al. | | |
| 7,027,463 B2 * | 4/2006 | Mathew et al. | ............... | 370/463 |
| 7,382,479 B2 * | 6/2008 | Hirose | .................. | G06F 3/1204 |
| | | | | 715/762 |
| 7,653,879 B1 * | 1/2010 | Sareen et al. | .................. | 715/752 |
| 2004/0162879 A1 * | 8/2004 | Arcuri et al. | .................. | 709/206 |
| 2009/0064053 A1 * | 3/2009 | Crawford | ............. | G06T 11/206 |
| | | | | 715/854 |
| 2011/0004632 A1 * | 1/2011 | Martino et al. | ............... | 707/802 |

OTHER PUBLICATIONS

Microsoft Corporation, Computer Dictionaries, 2002, Microsoft Press, p. 268.*

* cited by examiner

*Primary Examiner* — Jeffrey A Gaffin
*Assistant Examiner* — Nhat-Huy T Nguyen
(74) *Attorney, Agent, or Firm* — McDermott Will & Emery LLP (57) ABSTRACT

A system and machine-implemented method is provided for generating an e-mail filter including receiving an indication of a selection of a simple filter representing a filter criterion and a placement of the simple filter icon within a display area displaying a visual representation of a collection of e-mail filters corresponding to the user, receiving an indication of a selection of an action icon representing an action to be performed with respect to an e-mail message and a placement of the action icon within the filter display area with respect to the simple filter icon, the placement representing a connection of the action icon with the simple filter icon, generating an e-mail filter comprising one or more filter criteria including the filter criterion in response to receiving the indication of the placement of the action icon and assigning the action to the e-mail filter.

21 Claims, 6 Drawing Sheets

SYSTEM AND METHOD FOR VISUAL DISPLAY OF E-MAIL FILTERS

CROSS-REFERENCES TO RELATED APPLICATIONS

The present application is a continuation of U.S. patent application Ser. No. 13/227,371, entitled "System and Method for Visual Display of E-Mail Filters," filed on Sep. 7, 2011, which is hereby incorporated by reference in its entirety for all purposes.

BACKGROUND

The subject disclosure generally relates to e-mail messages, and, in particular, to managing e-mail filters.

Existing e-mail service providers offer users the capability of organizing incoming e-mail within different e-mail folders or labels using incoming e-mail filters. Typically, for each e-mail folder or label, the user has to individually indicate one or more filter criteria to generate an e-mail filter to detect e-mail that is to be organized within the e-mail folder. Furthermore, to view and modify existing e-mail filters, the user generally has to select each e-mail filter individually.

Additionally, it may be difficult to confirm that an e-mail filter is correctly applied to e-mail messages. Thus, a more efficient manner of creating, viewing and managing e-mail filters may be desirable.

SUMMARY

The disclosed subject matter relates to a machine-implemented method for generating an e-mail filter using a filter visual display, the method comprising receiving an indication of a selection of a first simple filter icon, wherein the first simple filter icon represents a first filter criterion. The method further comprising receiving an indication of a placement of the first simple filter icon within a display area, wherein the first simple filter icon is associated with a value defining an output of the first simple filter icon, and wherein the display area displays a filter visual display comprising a visual representation of a collection of e-mail filters corresponding to the user. The method further comprising receiving an indication of a selection of a first action icon, wherein the first action icon represents a first action to be performed with respect to an e-mail message. The method further comprising receiving an indication of a placement of the first action icon within the filter display area with respect to the first simple filter icon, wherein the placement of the first action icon with respect to the first simple filter icon represents a connection of the first action icon with the first simple filter icon. The method further comprising generating a first e-mail filter comprising one or more filter criteria including the first filter criterion in response to receiving the indication of the placement of the first action icon, wherein the generating the first e-mail filter comprises generating the first e-mail filter based at least in part on the value assigned to the first simple filter icon and assigning the first action to the first e-mail filter.

The disclosed subject matter also relates to a system for generating and displaying an e-mail filter using a filter visual display, the system comprising one or more processors and a machine-readable medium comprising instructions stored therein, which when executed by the processors, cause the processors to perform operations comprising receiving an indication of a selection of a simple filter icon by a user, wherein the simple filter icon represents a filter criterion and further includes a value assigned by the user. The operations further comprising receiving an indication of a placement of a filter icon within a display area displaying by a user, wherein the first simple filter icon is associated with a value defining an output of the first simple filter icon, and the display area displaying a filter visual display comprising a visual representation of a collection of e-mail filters corresponding to the user. The operations further comprising receiving an indication of a placement of an action icon within the display area, wherein the action icon represents an action to be performed with respect to the e-mail message. The operations further comprising generating an e-mail filter based on the one or more filter criteria and the value, in response to receiving the indication of the placement of the action icon. The operations further comprising assigning the action represented by the action icon to the e-mail filter and providing the e-mail filter to be displayed within the display area, the displayed e-mail filter including the filter icon, a visual representation of the value, the action icon and a visual representation of the connection between the filter icon and the action icon.

The disclosed subject matter also relates to a machine-readable medium comprising instructions stored therein, which when executed by a machine, cause the machine to perform operations comprising receiving an indication of a selection of a simple filter icon by a user, wherein the simple filter icon represents a filter criterion and further includes a value assigned by the user, wherein the value defines the output of the simple filter icon. The operations further comprising receiving an indication of a placement of the simple filter icon within a display area, the display area displaying a filter visual display comprising a visual representation of a collection of e-mail filters corresponding to the user. The operations further comprising receiving an indication of a placement of an action icon within the display area, wherein the action icon represents an action to be performed with respect to the e-mail message. The operations further comprising generating an e-mail filter based on at least the filter criterion and the value in response to receiving the indication of the placement of the action icon and assigning the action to the e-mail filter, wherein the e-mail filter is displayed within the display area including the simple filter icon, a visual representation of the value, the action icon, and a visual representation of the connection between the simple filter icon and the action icon.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

E-mail filtering is the processing of e-mail to organize it according to a collection of specified filter criteria referred to as an "e-mail filter". E-mail filters may be applied to process incoming e-mail messages and outgoing e-mail messages, as well as to search among existing e-mail messages. Users may create e-mail filters that then automatically filter e-mail messages according to the specified filter criteria.

During the e-mail filtering process, e-mail messages are input and processed according to e-mail filters, and an action is performed as the output. Possible actions for incoming e-mail messages may include passing the e-mail message through unchanged for delivery to the user's inbox, assigning a label to the e-mail message, redirecting the e-mail message for delivery elsewhere (e.g., a different folder or a different e-mail address), and removing the e-mail message. When searching through existing e-mail messages, the action usually comprises returning the e-mail messages to the user. Additionally, the retrieved e-mail messages may be forwarded to different mailboxes or recipients or may even be removed. Similar actions may be performed with respect to outgoing e-mail messages.

The subject disclosure provides a method and system for generating a filter visual display for the user, where the filter visual display illustrates one or more e-mail filters generated by the user. The filter visual display may include one or more simple filters placed in relation to one another (e.g., representing an AND or OR operation) and terminating in actions. As used herein, "simple filters" refer to a single filter criterion or attribute applied to e-mail messages.

Figure 1:
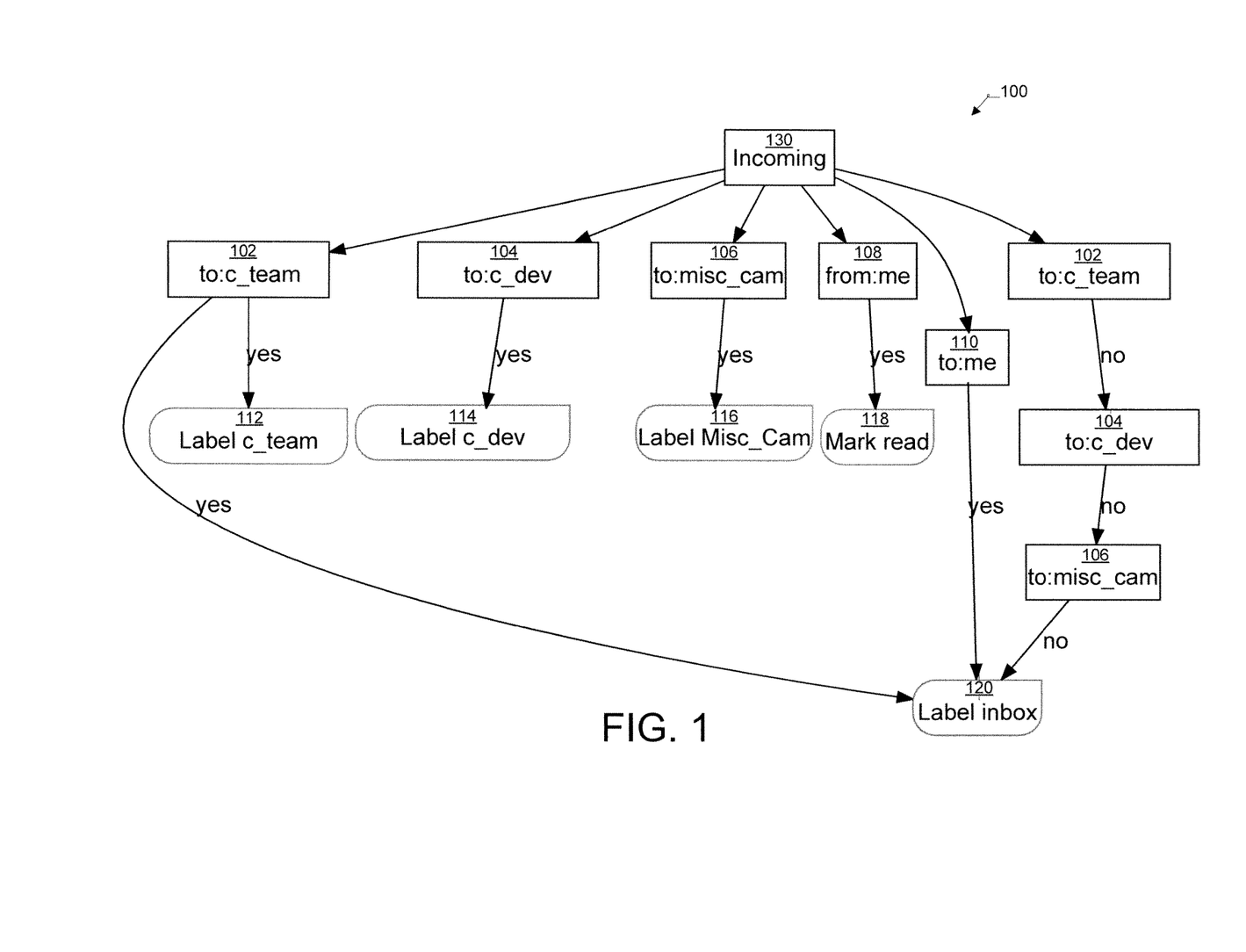
FIG. 1 illustrates an example filter visual display illustrating incoming e-mail filters of a user of the system.

FIG. 1 illustrates an example filter visual display 100 illustrating incoming e-mail filters of a user of the system. As illustrated, the exemplary filter visual display 100 includes simple filter icons 102, 104, 106, 108 and 110 and action icons 112, 114, 116, 118 and 120. Each e-mail filter within the filter visual display comprises one or more simple filters, represented by simple filter icons (e.g., simple filter icons 102-110) connected to one another, and terminates in an action, represented by an action icon (e.g., action icons 112-120).

Simple filter icons may be created through a user specification (e.g., text specification) of a filter criterion. For example, a user may be provided with a graphical user interface and may specify a filter criterion identifier (e.g., by selecting the filter criterion from a list displayed at the graphical user interface or by entering an identifier of the filter criterion into a text entry box displayed at the graphical user interface). The user may define the selected filter criterion. The definition refers to a value assigned to a specific filter criterion identifier to create the filter criterion. The system then receives a data set including the selected filter criterion. The system then creates a simple filter icon (i.e., a visual representation of the selected filter criterion) and associates the simple filter icon with the filter criterion specified within the data set. Filter criteria represented by simple filter icons may include recipient of the e-mail message (e.g., from:, on behalf of:), destination of the e-mail message (e.g., to:, cc:, bcc:), subject of the e-mail message, content of the e-mail message (e.g., e-mail messages containing a specific text string or not containing specific text string), whether the e-mail message has an attachment, or similar e-mail attributes. Alternatively, one or more simple filter icons defining filter criterion may be pre-generated by the system.

Additionally, action icons may be created through a user specification (e.g., a text specification) of an action. For example, a user may be provided with a graphical user interface and may select an action (e.g., by selecting the action from a list displayed at the graphical user interface, or by entering an identifier of the action into a text entry box displayed at the graphical user interface). The system then receives a data set including the action specified by the user, creates an action icon (i.e., a visual representation of the simple filter) and associates the action icon with the action specified within the data set. Alternatively, one or more action icons may be pre-generated by the system.

Each action icon may include one input and zero or one outputs to allow for reusing the e-mail filters (e.g., performing a first action with respect to a combination of one or more simple filters but continuing to compare against other simple filters to create a second e-mail filter terminating in a second action). Actions represented by action icons may include sending the e-mail message to the user's inbox or other folder, archiving the e-mail message, marking the e-mail message as read, applying a label to the e-mail message, forwarding the e-mail message to another e-mail address, deleting the e-mail message, marking the e-mail message as important, not sending the e-mail message to the spam folder, not marking the e-mail message as important or other similar actions performable with respect to an e-mail message.

Simple filter icons may be placed with respect to other simple filter icons within the filter visual display to form an e-mail filter. An AND operation may be represented by placing two simple filter icons in series (e.g., simple filter icons 102, 104 and 106 terminating in action icon 120 as illustrated in FIG. 1). An OR operation may be represented by splitting an out put within the e-mail filter pipe (e.g., an output from the incoming mail, a simple filter or action icon) into multiple simple filter icons (e.g., simple filter icon 102, simple filter icon 110 and combination of simple filter icons 102, 104 and 106 terminating in action icon 120) by placing the simple filter icons in parallel within the e-mail filter. An e-mail filter includes one or more simple filters and terminates in an action. An action may include an input such that an e-mail filter (a combination of simple filters) may be reused in combination with other simple filters to create a second e-mail filter terminating in a new action. Similarly, each simple filter may include an output for being linked to other simple filters or to an action. Each simple filter may include a value associated with the output (e.g., a yes or no) for processing the e-mail messages through the filters. The filter visual display 100 may further display the connections between the simple filter icons 102-110 and action icons 112-120.

An indication of a value of the output of each simple filter icon may further be displayed within the filter visual display 100. The value displayed corresponds to one of filtering e-mail messages meeting the defined filter criterion associated with the simple filter icon (e.g., displayed as a "yes") and filtering e-mail messages not satisfying the defined filter criterion (e.g., displayed as a "no"). For example, when the user selects the simple filter icon 102 the user may assign a value indicating that e-mail messages sent to the c_team should pass through the filter (e.g., a yes value) or that e-mail message sent to the c_team should be filtered (e.g., a no value).

The filter visual display 100 illustrates an exemplary visual display of e-mail filters of a user of the system. The filter visual display 100 assumes that no labels, including "inbox" are attached to an incoming message, represented by the "incoming" icon 130. The filter visual display 100 displays e-mail filters representing actions for putting all messages that are directed to the user, identified as "me", (i.e. a yes on simple filter icon 110) or to c_team (i.e., a yes on simple filter icon 102) or that do not have any filters that apply to them (i.e., a no on simple filter icons 102, 104 and 106) in the inbox (i.e., a yes on action icon 120). Additionally, the filter visual display 100 displays an e-mail filter for marking all messages from the user, identified as "me" (i.e., a yes on simple filter icon 108) as read, and three separate e-mail filters for labeling messages with a label corresponding to their mailing list (i.e., a yes on simple filter icon 102, a yes on simple filter icon 104, and a yes on simple filter icon 106). E-mail messages may flow down multiple e-mail filters, unless they are filtered, so a message may conceivably end up marked as read and marked with various labels.

As illustrated in filter visual display 100 of FIG. 1, simple filter icons represented by a simple filter are only created once by the user and may be reused in different filters (e.g., simple filter icons 102, 104 and 106 are reused). Thus, the user is able to create simple filters using a textual specification and use the simple filter icon associated with the simple filter repeatedly to create additional e-mail filters. For example, the user may be presented with a listing of all existing simple filters and upon selecting the desired simple filter may be presented with a selectable simple filter icon. The user may then create an e-mail filter by dragging and placing the simple filter icons within the display area (e.g., canvas) displaying the filter visual display 100.

Thus, the system enables the user to view what order e-mail filters are applied in. Furthermore, the filter visual display 100 may provide the user with additional interactive features. For example, a user may create additional e-mail filters while viewing the existing e-mail filters. In one aspect, the user may drag one or more existing simple filter icons and action icons into the filter visual display to create new e-mail filters. The user may further create new simple filters icons or action icons by textually specifying a new filter criteria or action. The system may then generate a simple filter icon or action icon associated with the generated new simple filter or action.

Additionally, the user may use the filter visual display 100 for the purpose of debugging. In one aspect, while the filter visual display 100 is being displayed to the user, the user may select a particular e-mail message and all pipes (e-mail filters) that the selected e-mail message would flow through may be highlighted or otherwise visually distinguished. Thus, the user is able to spot any errors in the e-mail filtering process easily by viewing all applicable e-mail filters and the interaction between different filters (simple filter and e-mail filters) and actions.

Still further, while the filter visual display 100 is displayed to the user, the user may be able to visually edit one or more pipes (e-mail filters) within the filter visual display 100 to add new simple filters icons, new action icons, remove existing simple filter icons and action icons or rearrange the connection between existing simple filter icons and action icons (e.g., in response to debugging).

Figure 2:
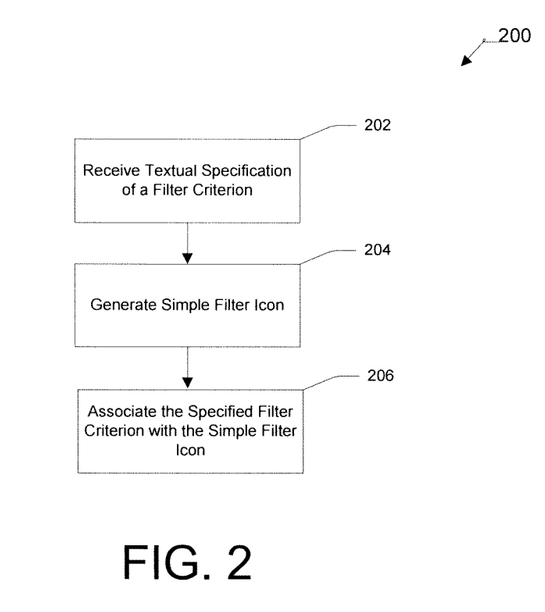
FIG. 2 illustrates a flow diagram of a process for creating a simple filter icon.

FIG. 2 illustrates a flow diagram of a process 200 for creating a simple filter icon. In step 202, the system receives a textual specification of a filter criterion (e.g., including a filter criterion identifier and definition) from a user of the system. For example, the user may be presented with a graphical user interface for specifying the filter criterion (e.g., upon the system receiving a selection from the user that the user wishes to create a new simple filter icon or a system determination that a new simple filter icon should be created). The filter criterion entered by the user may include a recipient of the e-mail message (e.g., from:, on behalf of:), a destination of the e-mail message (e.g., to:, cc:, bcc:), a subject of the e-mail message, content of the e-mail message (e.g., e-mail messages containing a specific text string or not containing specific text string), whether the e-mail message has an attachment, or similar e-mail attributes. In one aspect, the possible filter criterion identifiers are presented to the user within the graphical user interface and the user may select the appropriate filter criterion identifier (e.g., to:) and enter a definition for the selection filter criterion identifier (e.g., a recipient for the filter criterion to:), thus specifying the filter criterion.

In step 204, the system generates a simple filter icon (i.e., a visual representation of the simple filter) for the specified filter criterion. The visual representation may comprise a box displaying text indicating the filter criterion including the filter criterion identifier and definition specified by the user (e.g., simple filter icon 108). In step 206, the system associates the simple filter icon with the filter criterion specified by the user. The generated simple filter icon may be stored within a database along with the associated defined filter criterion for later retrieval and display to the user.

In one aspect, in addition to the simple filter icons, a user may further be able to generate a complex filter icon. A complex filter icon may include two or more filter criteria. The generation of a complex filter icon may be desirable where the user desires to apply a set of related filter criteria in several different e-mail filters. Complex filter icons may be generated in a manner similar to a simple filter icon, with the icon being associated with the two or more filter criteria and their corresponding definition as specified by the user.

Figure 3:
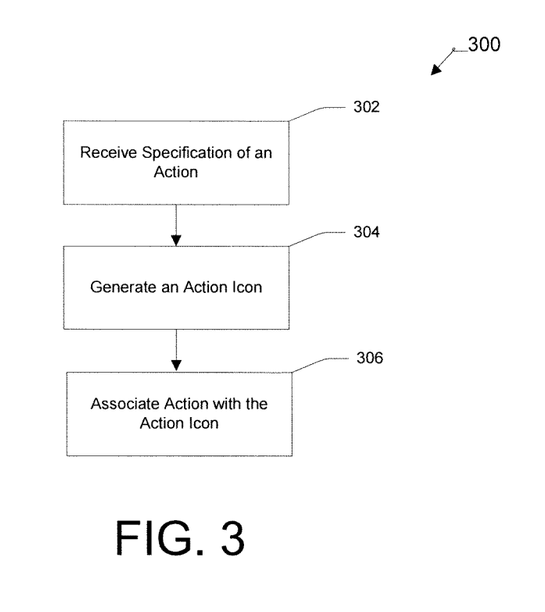
FIG. 3 illustrates a flow diagram of a process for creating an action icon.

FIG. 3 illustrates a flow diagram of a process 300 for creating an action icon. In step 302, the system receives a user input of an action from a user of the system. For example, the user may be presented with a graphical user interface for inputting or selecting an action (e.g., upon the system receiving a selection from the user that the user wishes to create a new action icon or a system determination that a new action icon should be created). The action selected or inputted by the user may include sending the e-mail message to the user's inbox or other folder, archiving the e-mail message, marking the e-mail message as read, applying a label to the e-mail message, forwarding the e-mail message to another e-mail address, deleting the e-mail message, marking the e-mail message as important, never sending the e-mail message to the spam folder, never marking the e-mail message as important or other similar actions performable with respect to an e-mail message. In one aspect, the actions are presented to the user within a graphical user interface and the user may select the appropriate action (e.g., to label an e-mail message).

In step 304, the system generates an action icon (i.e., a visual representation of the action) for the inputted filter criterion. The visual representation may comprise a box having text indicating the action associated with the action icon (e.g., action icon 120). In step 306, the system associates the generated action icon with the action specified by the user. The generated action icon may be stored within a database along with the associated action for later retrieval and display to the user.

In one aspect, an action icon may be associated with more than one action. This may be desirable where the user desires that the same set of closely related actions (e.g., label inbox and mark as read) be performed with respect to e-mail messages being filtered through different e-mail filters.

Figure 4:
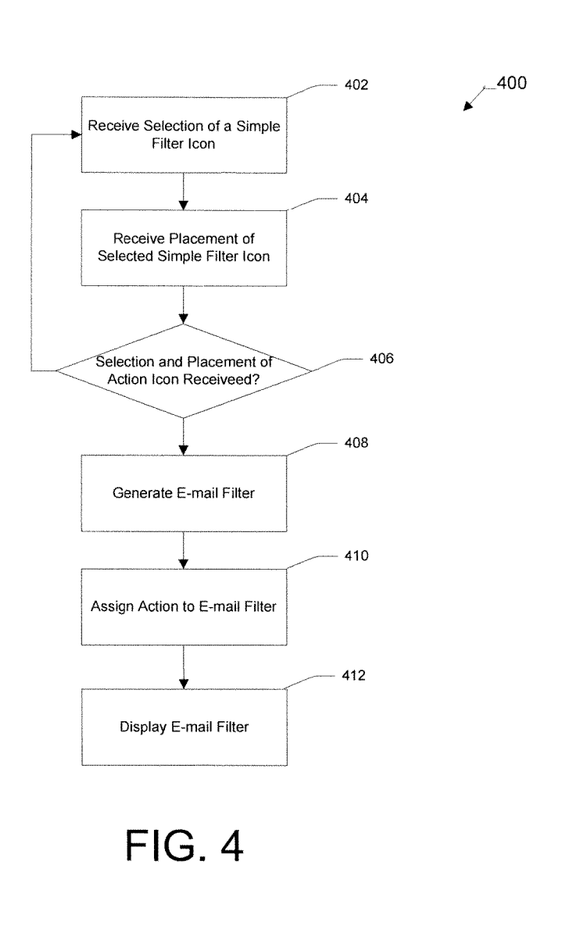
FIG. 4 illustrates a flow diagram of a process for generating e-mail filters according to user selections within a filter visual display.

FIG. 4 illustrates a flow diagram of a process 400 for generating e-mail filters according to user selections within a filter visual display (e.g., e-mail filter visual display 100). In step 402, the system receives an indication of a selection of a simple filter icon from the user. For example, the user may select an existing simple filter icon or create a new simple filter icon (e.g., according to process 200 of FIG. 2) and may drag the simple filter icon into a display area displaying the filter visual display 100.

In step 404, the system receives an indication of a placement of the selected simple filter icon. The simple filter icon may be placed with respect to other simple filter icons (e.g., the output of one simple filter icon may become an input into a second filter icon) to form an e-mail filter. AND operations may be represented by placing two simple filter icons in a series (e.g., simple filter icons 102, 104 and 106 terminating in action icon 120 as illustrated in FIG. 1) and OR operations may be represented by splitting an output (e.g., an output from the incoming mail, a simple filter or action icon) into multiple simple filters (e.g., simple filter icon 102, simple filter icon 110 and combination of simple filter icons 102, 104 and 106 terminating in action icon 120).

Each simple filter may include an input and output for being linked to other simple filter icons or action icons. Each simple filter may include a value defining its output (e.g., a yes or no). The value corresponds to one of filtering an e-mail message meeting the defined filter criterion associated with the simple filter icon (e.g., a yes value or true value) and passing through (not filtering) an e-mail message failing the defined filter criterion associated with the simple filter icon (e.g., a no value or false value). For example, when the user selects the simple filter icon 102 corresponding to the filtering criterion that the recipient of an e-mail message is identified as the c_team, the user may assign a "yes" or "true" value to the simple filter icon 102 indicating that e-mail messages sent to the c_team should be outputted or a "no" or "false" value indicating that e-mail messages sent to the c_team should be filtered (e.g., a no value). The user may indicate the value for the simple filter icon during step 402 after selecting the simple filter icon. Alternatively, the indication of value of the simple filter icon may occur during step 404.

The process 400 may continue to monitor for selection, placement and linking of simple filter icons within the display area displaying the filter visual display 100 (steps 402 and 404) until in step 406, the system receives an indication of an action icon being placed within the display area displaying the filter visual display 100. An e-mail filter includes one or more filter criteria and terminates in an action. Thus, upon receiving an indication of the selection of an action icon and placement of the action association with simple filter icons detected in steps 402 and 404, the system continues to step 408. In step 408, the system generates an e-mail filter corresponding to the combination of the filter criterion represented by the detected simple filter icons (e.g., detected in steps 402 and 404) according to the detected output value and placement (e.g., in parallel or series) of the simple filter icons. Next, in step 410, the system assigns the action represented by the action icon detected in step 406, with the generated e-mail filter. In some aspects, similar to simple filter icons, complex filter icons may additionally be detected in steps 402 and 404 and included within e-mail filters.

The action icon may include an output, such that the e-mail filter may be reused by being combined with other filter criteria represented by simple filter icons to create a second e-mail filter terminating in a new action. Accordingly, the process 400 may be performed with respect to incoming e-mail messages (e.g., representing by incoming icon 130) or e-mail messages output from an action icon (e.g., e-mail messages already filtered according to a first e-mail filter).

Once the e-mail filter is generated and associated with the action it may be stored for processing of e-mail messages. Additionally, in step 412, the e-mail filter may be displayed to the user within the filter visual display 100. While viewing the one or more e-mail filters within the filter visual display 100, a user may rearrange, remove or add simple filter icons or action icons.

Figure 5:
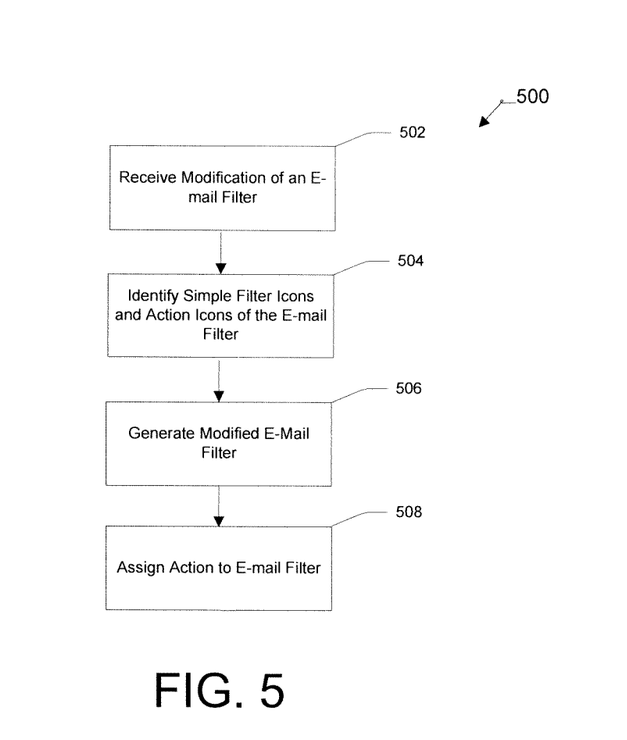
FIG. 5 illustrates a flow diagram of a process for editing e-mail filters being displayed within a filter visual display.

FIG. 5 illustrates a flow diagram of a process 500 for editing e-mail filters being displayed within a filter visual display (e.g., filter visual display 100). In step 502, the system receives an indication of a modification of an e-mail filter displayed within the filter visual display 100. For example, in step 502 the user may rearrange, remove or add simple filter icons or action icons associated with the e-mail filter. Upon detecting the modification, in step 504, the system identifies the simple filter icons and the placement of the simple filter icons, and the action icon assigned to the e-mail filter. The identified simple filter icons and action icons include any modifications made by the user (e.g., rearranging, removing or adding simple filter icons or action icons). In step 506, the system generates a modified e-mail filter including the one or more filter criterion (and values) associated with the simple filter icons identified in step 504. Next, in step 508, the system assigns the action associated with the action icon identified in step 504 with the generated modified e-mail filter.

While the above implementations are described with respect to incoming e-mail messages, it should be understood by one skilled in the art, that a visual display of e-mail filters corresponding to searching e-mail messages or outgoing e-mail messages may similarly be provided to a user of the system accordingly to the features and processes described throughout the specification and the figures.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
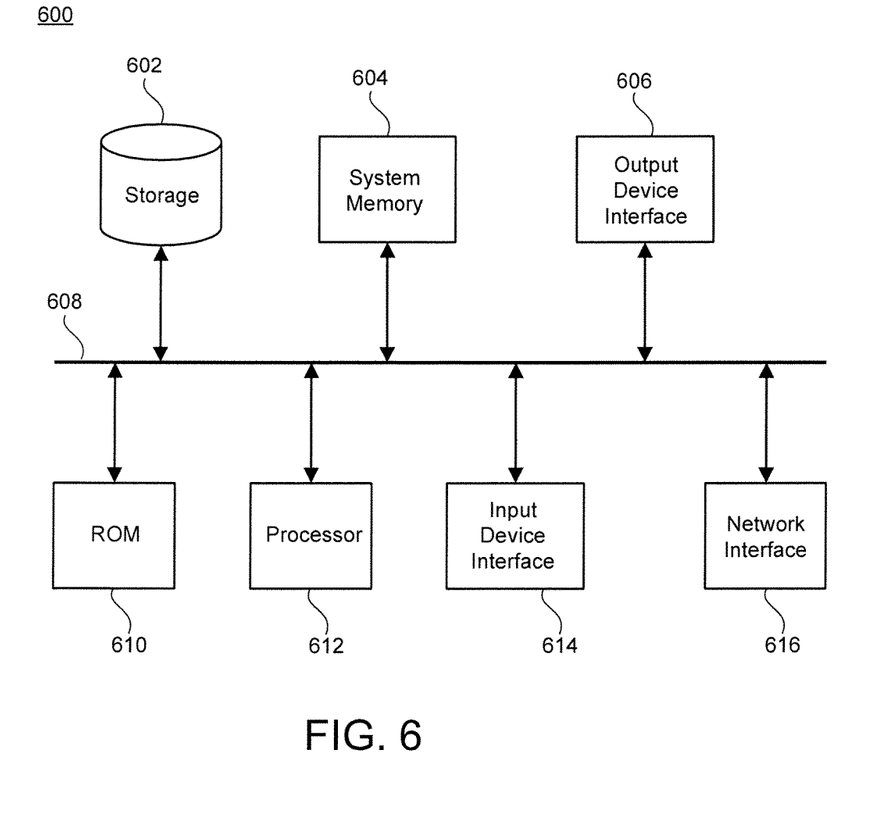
FIG. 6 conceptually illustrates an electronic system with which some implementations of the subject technology are implemented.

FIG. 6 conceptually illustrates an electronic system with which some implementations of the subject technology are implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for processing multimedia items in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
   receiving an indication of a placement of a first simple filter icon within a display area, wherein the first simple filter icon is associated with a first filter criterion and the first simple filter icon is movable throughout the display area;
   receiving an indication of a placement of a first action icon within the display area with respect to the first simple filter icon, the first action icon being associated with a first action to be performed with respect to an e-mail message, wherein the placement of the first action icon with respect to the first simple filter icon represents a connection of the first action icon with the first simple filter icon and the first action icon is movable throughout the display area;
   generating a first e-mail filter comprising one or more filter criteria including the first filter criterion associated with the first simple filter icon in response to receiving the indication of the placement of the first action icon; and
   assigning the first action associated with the first action icon to the first e-mail filter, the assigned first action being performed on one or more e-mail messages that comprise an output of the first e-mail filter, and at least one email message input to the first e-mail filter being filtered out and not flowing past the first e-mail filter.

2. The method of claim 1, wherein the first simple filter icon is associated with a value that indicates whether e-mail messages satisfying the first filter criterion comprise the output of the first simple filter icon or whether the e-mail messages satisfying the first filter criterion are filtered from the output of the first simple filter icon.

3. The method of claim 2, wherein the output of the first simple filter icon comprises e-mail messages not satisfying the first filter criterion when the value associated with the first simple filter icon indicates that the e-mail messages satisfying the first filter criterion are filtered from the output of the first simple filter icon.

4. The method of claim 2, further comprising:
   providing the first e-mail filter for display within the display area, wherein providing the first e-mail filter for display comprises providing for display the first simple filter icon, the first action icon, a first visual representation of the connection between the first simple filter and the first action icon, and a second visual representation of the value assigned to the first simple filter icon, wherein the first visual representation of the connection between the first simple filter and the first action icon is visually distinct from the first simple filter and the first action icon.

5. The method of claim 1, further comprising:
   receiving an indication of a placement of a second simple filter icon with respect to the first simple filter icon within the display area, the second simple filter icon representing a second filter criterion, wherein the placement of the second simple filter icon with respect to the first simple filter icon represents a connection between the first simple filter icon and the second simple filter icon, the connection representing one of an AND operation and an OR operation between the first filter criterion and the second filter criterion, wherein the generating the first e-mail filter comprises generating the first e-mail filter according to the connection between the first simple filter icon and second simple filter icon, and wherein the filter criteria includes the second filter criterion.

6. The method of claim 5, wherein the placement of the second simple filter icon with respect to the first simple filter icon in a series represents the connection corresponding to the AND operation.

7. The method of claim 5, wherein the placement of the second simple filter icon with respect to the first simple filter icon in parallel represents the connection corresponding to the OR operation.

8. The method of claim 1, further comprising:
   receiving an indication of a placement of a second simple filter icon with respect to the first action icon within the display area, wherein the placement of the second simple filter icon with respect to the first action icon represents a connection between the first e-mail filter and the second simple filter icon;
   receiving an indication of a placement of a second action icon within the display area with respect to the second simple filter icon, the second action icon representing a second action to be performed with respect to the e-mail message, wherein the placement of the second action icon with respect to second simple filter icon represents a connection of the second action icon with the first e-mail filter and the second simple filter icon;
   generating a second e-mail filter including filter criteria associated with the first e-mail filter and a second filter criterion associated with the second simple filter icon, in response to receiving the indication of the placement of the second action icon; and
   assigning the second action to the second e-mail filter, the second action being performed on e-mail messages comprising an output of the second simple filter icon.

9. The method of claim 1, further comprising:
   receiving a request to generate the first simple filter icon;
   receiving a selection of a filter criterion identifier and a definition for a first filter criterion identifier from a user; and
   generating the first simple filter icon in response to the request, wherein the first filter criterion comprises the selected filter criterion identifier and the definition.

10. The method of claim 1, further comprising:
    receiving a request to generate the first action icon;
    receiving a selection of the first action from a user;
    generating the first action icon in response to the request; and
    associating the first action with the first action icon.

11. The method of claim 1, wherein the display area includes a filter visual display comprising a visual representation of a collection of e-mail filters that comprises one or more e-mail filters including the first e-mail filter, each of the one or more e-mail filters including at least one filter criterion and a corresponding action, wherein the at least one filter criterion and the corresponding action are associated according to a connection.

12. The method of claim 11, wherein the filter visual display comprises one or more simple filter icons representing filter criteria and one or more action icons representing actions corresponding to the one or more e-mail filters displayed based on the connection between the simple filter icons and action icons for each e-mail filter.

13. The method of claim 10, further comprising:
    receiving a selection of the e-mail message processed through the first e-mail filter; and
    providing the first simple filter icon for display such that the first simple filter icon is displayed having a visually distinctive characteristic.

14. The method of claim 1, further comprising:
receiving an indication of a modification of the first e-mail filter, wherein the modification comprises at least one of rearranging the placement of one of the first simple filter icon and the first action icon, removing one of the first simple filter icon and the first action icon or adding a second simple filter icon or a second action icon; and
generating a modified e-mail filter based on the received modification.

15. The method of claim 14, wherein the modification comprises removing the first action icon and adding the second action icon, and wherein generating the modified e-mail filter comprises associating a second action corresponding to the second action icon to the modified e-mail filter.

16. The method of claim 1, wherein the first filter criterion comprises one of a recipient of the e-mail message, a destination of the e-mail message, a subject of the e-mail message, a content of the e-mail message and a determination of whether the e-mail message has an attachment.

17. The method of claim 1, wherein the first action comprises one of sending the e-mail message to an inbox or other folder, archiving the e-mail message, marking the e-mail message as read, applying a label to the e-mail message, forwarding the e-mail message to another e-mail address, deleting the e-mail message, marking the e-mail message as important, refraining from sending the e-mail message to a spam folder and refraining from marking the e-mail message as important.

18. A system comprising:
one or more processors; and
a machine-readable medium comprising instructions stored therein, which when executed by the processors, cause the processors to perform operations comprising:
receiving an indication of a placement of a filter icon within a display area by a user, wherein the filter icon is associated with a filter criterion and a value, the value indicating whether e-mail messages satisfying the filter criterion comprise an output of the filter icon or are filtered from the output of the filter icon and the filter icon is movable throughout the display area;
receiving an indication of a placement of an action icon within the display area, wherein the action icon represents an action to be performed with respect to an e-mail message and the action icon is movable throughout the display area;
generating an e-mail filter based on one or more filter criteria including the filter criterion and the value, in response to receiving the indication of the placement of the action icon; and
assigning the action represented by the action icon to the e-mail filter.

19. The system of claim 18, wherein the operations further comprise:
providing the e-mail filter for display within the display area, the displayed e-mail filter including the filter icon, a first visual representation of the value, the action icon and a second visual representation of a connection between the filter icon and the action icon, the second visual representation of the connection being visually distinct from the filter icon and the action icon.

20. A non-transitory machine-readable medium comprising instructions stored therein, which when executed by a machine, cause the machine to perform operations comprising:
receiving an indication of a selection of a simple filter icon by a user, wherein the simple filter icon represents a filter criterion and further includes a value assigned by the user, wherein the value indicates whether e-mail messages satisfying the filter criterion comprise an output of the simple filter icon or are filtered from the output of the simple filter icon;
receiving an indication of a placement of the simple filter icon within a display area, wherein the simple filter icon is movable throughout the display area;
receiving an indication of a placement of an action icon within the display area, wherein the action icon represents an action to be performed with respect to an e-mail message and the action icon has a different shape than the simple filter icon and the action icon is movable throughout the display area;
generating an e-mail filter based on at least the filter criterion and the value in response to receiving the indication of the placement of the action icon; and
assigning the action to the e-mail filter.

21. The non-transitory machine-readable medium of claim 20, wherein the e-mail filter is displayed within the display area including the simple filter icon, a visual representation of the value, the action icon, and a visual representation of a connection between the simple filter icon and the action icon.

* * * * *